(12) United States Patent
Castellaw et al.

(10) Patent No.: US 11,326,521 B2
(45) Date of Patent: May 10, 2022

(54) METHODS OF IGNITING LIQUID FUEL IN A TURBOMACHINE

(71) Applicant: General Electric Company, Schenectady, NY (US)

(72) Inventors: Steven C. Castellaw, Greenville, SC (US); David August Snider, Simpsonville, SC (US); Mark William Pinson, Greer, SC (US); Mark Mitchell, Greer, SC (US); Robert Walter Arnold, Greer, SC (US); Christopher Grant Cooper, Greenville, SC (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 16/916,422

(22) Filed: Jun. 30, 2020

(65) Prior Publication Data

US 2021/0404392 A1 Dec. 30, 2021

(51) Int. Cl.
| | | |
|---|---|---|
| *F02C 7/26* | (2006.01) | |
| *F02C 7/232* | (2006.01) | |
| *F02C 7/264* | (2006.01) | |
| *F23R 3/36* | (2006.01) | |
| *F23R 3/42* | (2006.01) | |
| *F02C 9/26* | (2006.01) | |

(52) U.S. Cl.
CPC ............... *F02C 7/26* (2013.01); *F02C 7/232* (2013.01); *F02C 7/264* (2013.01); *F23R 3/36* (2013.01); *F23R 3/42* (2013.01); *F02C 9/263* (2013.01); *F05D 2260/85* (2013.01)

(58) Field of Classification Search
CPC .. F02C 7/232; F02C 7/26; F02C 7/264; F02C 9/26; F02C 9/263; F02C 9/232; F23R 3/343; F23R 3/36; F23R 3/286; F23D 17/002; F05D 2260/85
See application file for complete search history.

(56) References Cited

U.S. PATENT DOCUMENTS

| | | | |
|---|---|---|---|
| 2,552,231 A | 1/1947 | Garbett et al. | |
| 2,865,441 A | 12/1958 | Coupe | |
| 3,668,869 A | 6/1972 | De Corso et al. | |
| 4,455,840 A * | 6/1984 | Matt | F23R 3/36 60/737 |
| 4,825,658 A | 5/1989 | Beebe | |
| 4,833,878 A | 5/1989 | Sood et al. | |
| 4,860,533 A | 8/1989 | Joshi | |

(Continued)

FOREIGN PATENT DOCUMENTS

WO WO2017002076 A1 1/2017

*Primary Examiner* — Alain Chau
(74) *Attorney, Agent, or Firm* — Dority & Manning, P.A.

(57) ABSTRACT

A method of igniting liquid fuel in a turbomachine combustor is provided. The method includes a step of initiating a flow of gaseous fuel from a gaseous fuel supply to a gaseous fuel nozzle. The method further includes a step of initiating a flow of liquid fuel from a liquid fuel supply to a primary liquid fuel cartridge. After initiating both the flow of gaseous fuel and the flow of liquid fuel, the method includes a step of igniting the flow of gaseous fuel and the flow of liquid fuel with an igniter. The method further includes a step of terminating the flow of gaseous fuel from the gaseous fuel supply to the gaseous fuel nozzle.

20 Claims, 7 Drawing Sheets

(56) References Cited

U.S. PATENT DOCUMENTS

| | | | |
|---|---|---|---|
| 5,237,812 A | 8/1993 | Mumford | |
| 5,359,847 A * | 11/1994 | Pillsbury | F23R 3/34 60/39.463 |
| 5,408,825 A | 4/1995 | Foss et al. | |
| 5,491,972 A | 2/1996 | Bretz et al. | |
| 5,524,582 A * | 6/1996 | Suh | F02D 19/0615 123/576 |
| 5,640,841 A | 6/1997 | Crosby | |
| 5,657,632 A | 8/1997 | Foss et al. | |
| 5,660,043 A | 8/1997 | Pfefferle et al. | |
| 6,128,894 A | 10/2000 | Joos et al. | |
| 6,201,029 B1 | 3/2001 | Waycuilis | |
| 6,250,065 B1 | 6/2001 | Mandai et al. | |
| 6,311,475 B1 | 11/2001 | Ngo-Beelman et al. | |
| 6,374,615 B1 | 4/2002 | Zupanc et al. | |
| 6,397,602 B2 | 6/2002 | Vandervort et al. | |
| 6,532,726 B2 * | 3/2003 | Norster | F23C 7/002 60/39.281 |
| 6,912,857 B2 | 7/2005 | Schmotolocha et al. | |
| 7,137,256 B1 | 11/2006 | Stuttaford et al. | |
| 7,299,620 B2 | 11/2007 | Stuttaford et al. | |
| 7,581,379 B2 * | 9/2009 | Yoshida | F01D 15/10 60/39.463 |
| 7,950,238 B2 | 5/2011 | Iasillo et al. | |
| 8,522,553 B2 | 9/2013 | Widener | |
| 8,966,879 B1 | 3/2015 | Munson | |
| 9,212,609 B2 * | 12/2015 | Twardochleb | F23R 3/343 |
| 9,388,745 B2 * | 7/2016 | Bothien | F02C 9/34 |
| 10,294,876 B2 * | 5/2019 | Laget | F02D 41/0027 |
| 10,634,358 B2 * | 4/2020 | Stoia | F02C 9/26 |
| 2001/0004827 A1 | 6/2001 | Vandervort et al. | |
| 2001/0027637 A1 * | 10/2001 | Norster | F23D 14/24 60/773 |
| 2004/0031257 A1 | 2/2004 | Schmotolocha et al. | |
| 2004/0221582 A1 | 11/2004 | Howell et al. | |
| 2004/0237532 A1 | 12/2004 | Howell et al. | |
| 2008/0264372 A1 | 10/2008 | Sisk et al. | |
| 2009/0173057 A1 * | 7/2009 | Yoshida | F23R 3/36 60/39.281 |
| 2009/0223226 A1 | 9/2009 | Koizumi et al. | |
| 2009/0272118 A1 | 11/2009 | Alexander et al. | |
| 2010/0154424 A1 * | 6/2010 | Twardochleb | F23R 3/343 60/740 |
| 2010/0220182 A1 | 9/2010 | Krull et al. | |
| 2011/0036092 A1 | 2/2011 | Lawson et al. | |
| 2012/0117976 A1 | 5/2012 | Krull et al. | |
| 2013/0086918 A1 * | 4/2013 | Bothien | F02C 9/34 60/776 |
| 2013/0098056 A1 | 4/2013 | Zhang et al. | |
| 2014/0007585 A1 | 1/2014 | Liu | |
| 2014/0137565 A1 * | 5/2014 | Twardochleb | F23R 3/343 60/776 |
| 2014/0260309 A1 | 9/2014 | Menon et al. | |
| 2015/0059353 A1 * | 3/2015 | Asai | F02C 3/22 60/778 |
| 2016/0003150 A1 | 1/2016 | DiCintio et al. | |
| 2016/0047318 A1 | 2/2016 | Dam et al. | |
| 2016/0258400 A1 * | 9/2016 | Sjöholm | F02M 21/0275 |
| 2017/0002742 A1 | 1/2017 | Jorgensen et al. | |
| 2017/0022882 A1 * | 1/2017 | Sturman | F02D 19/10 |
| 2017/0350590 A1 | 12/2017 | Choudhri et al. | |
| 2018/0363910 A1 * | 12/2018 | Stoia | F02C 3/30 |
| 2019/0010872 A1 | 1/2019 | Dam et al. | |
| 2019/0032561 A1 | 1/2019 | Stoia et al. | |

* cited by examiner

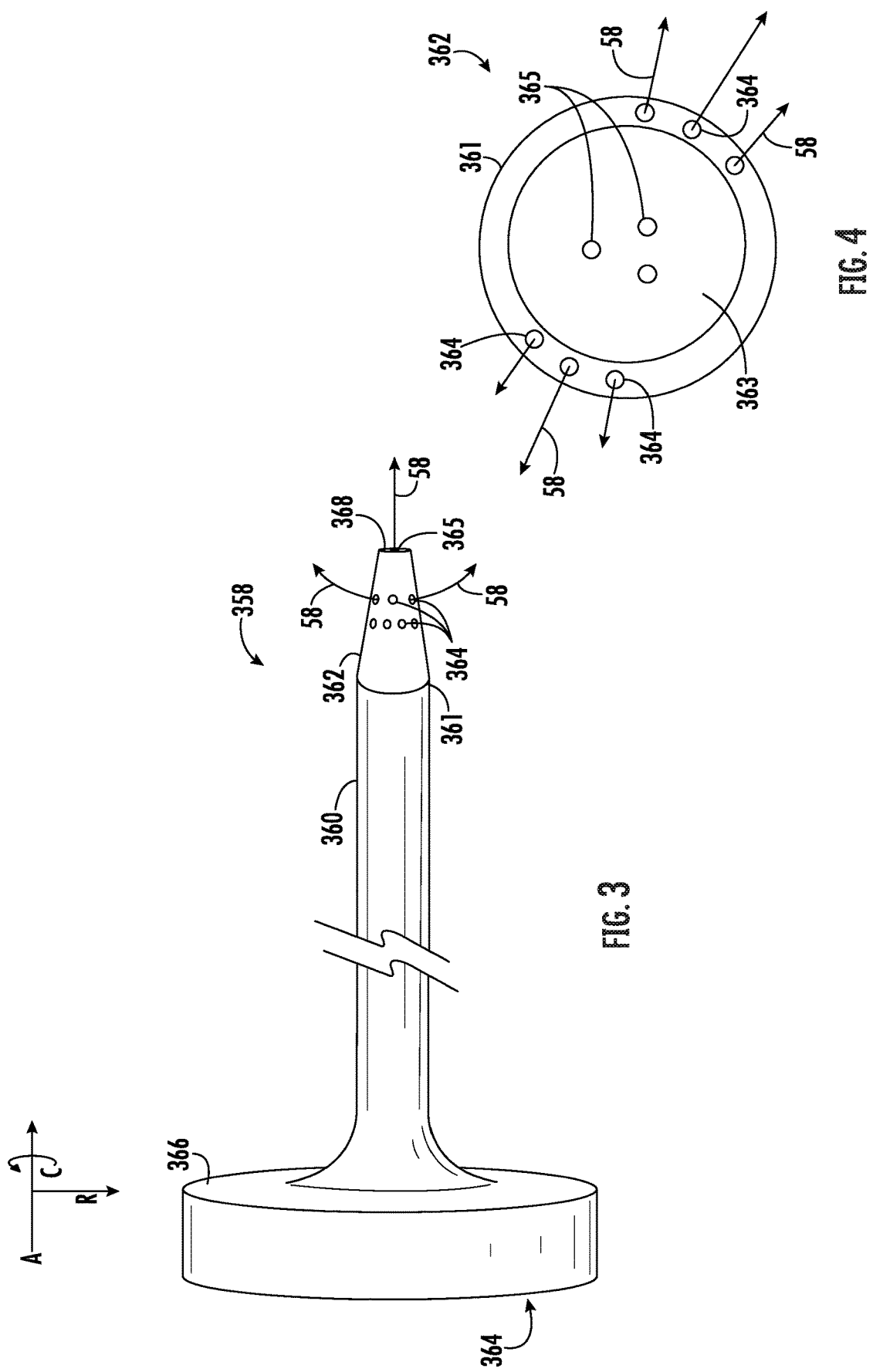

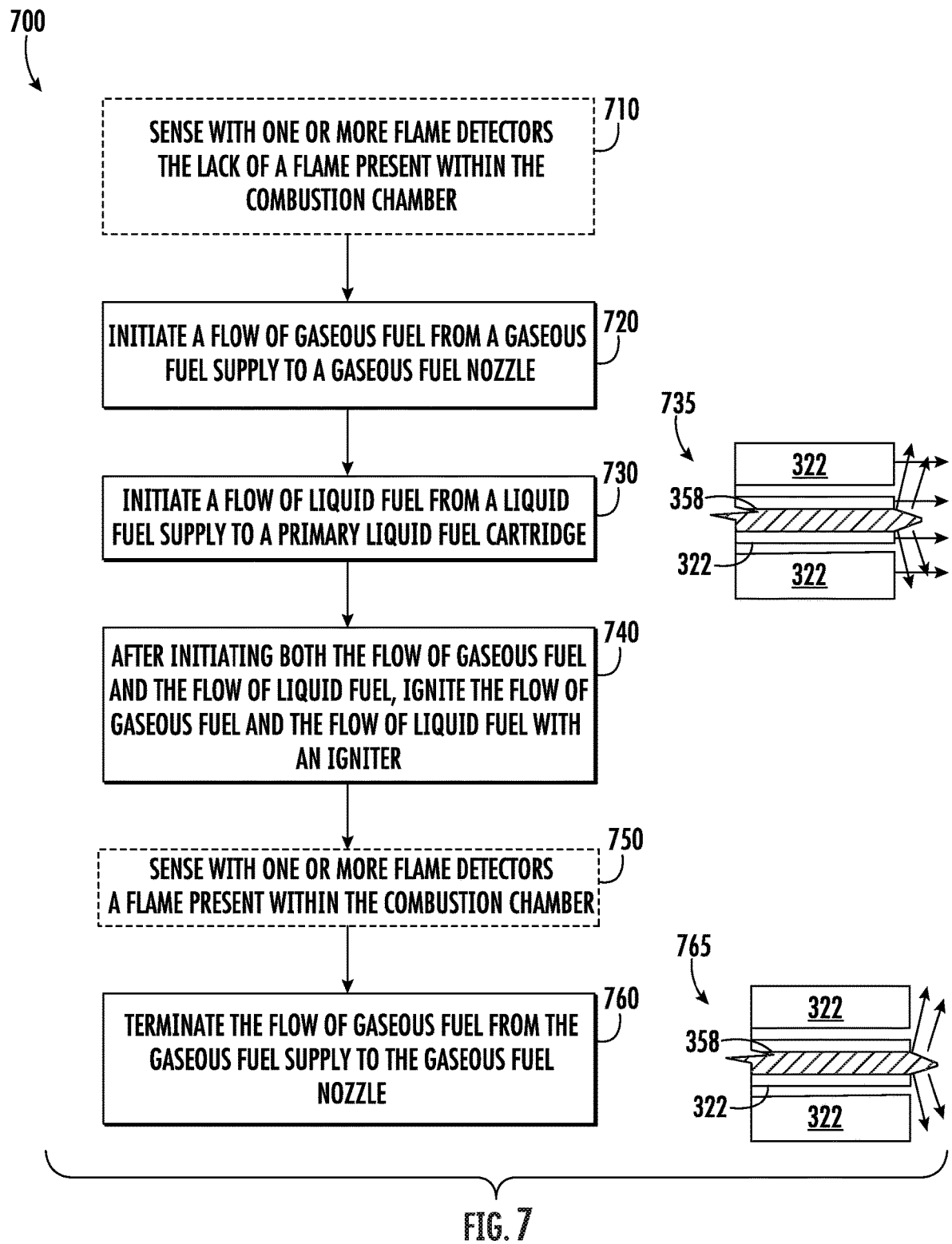

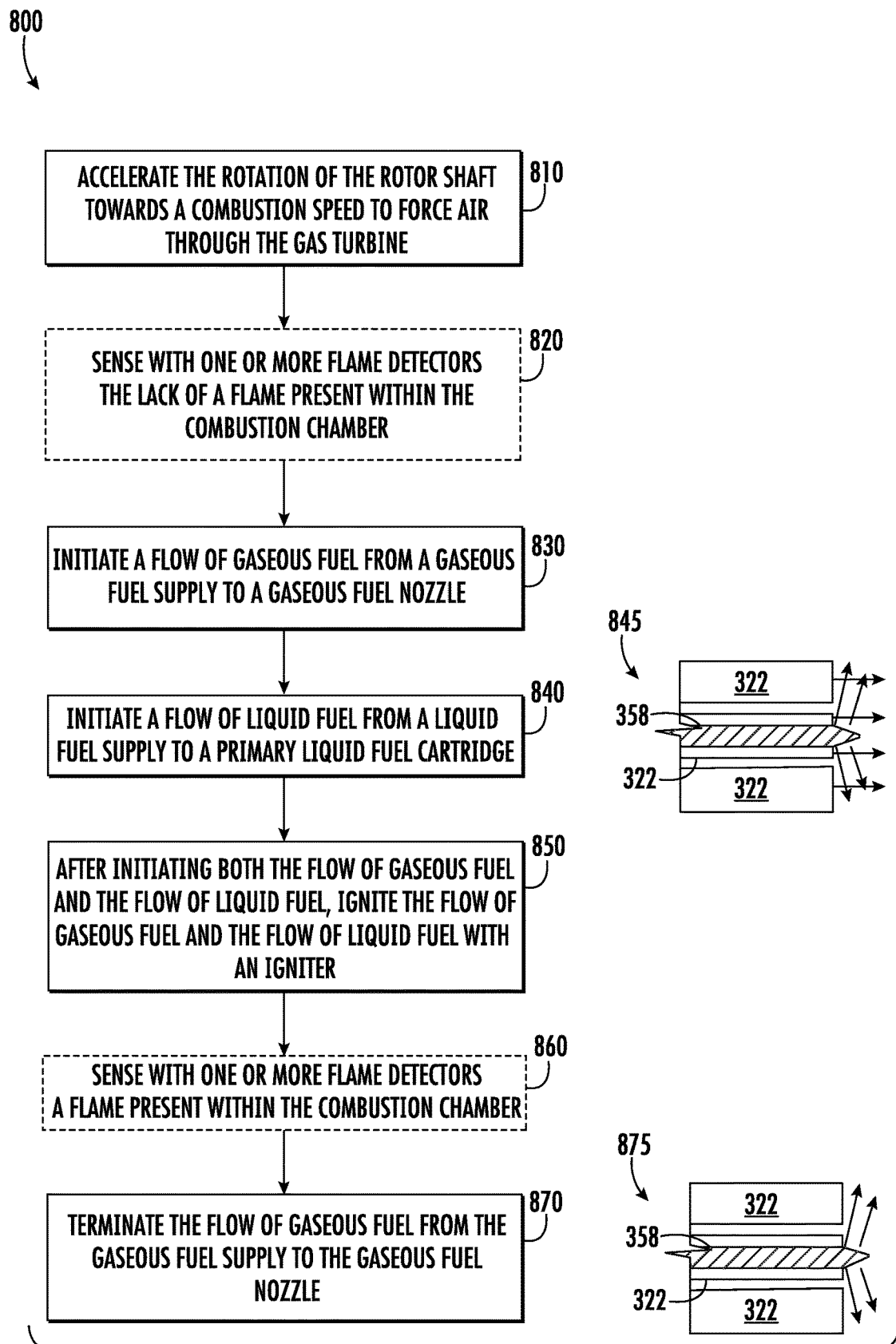

METHODS OF IGNITING LIQUID FUEL IN A TURBOMACHINE

FIELD

The present disclosure relates generally to methods of igniting liquid fuel in a turbomachine. In particular, this disclosure relates to methods of igniting liquid fuel within a combustor of a turbomachine.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel natural gas) mix within the combustion section and burn in a combustion chamber to generate high pressure and, high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In the combustion section, the fuel nozzles may operate solely on gaseous fuel, solely on liquid fuel, or simultaneously on gaseous fuel and liquid fuel. In many instances, a power-generation plant may experience occasions when it is necessary to operate for a given time using only liquid fuel. In these instances, plant operators have found it convenient to transition from gaseous fuel operation to liquid fuel operation. However, occasions arise during which the primary gaseous fuel supply is unavailable. During these occasions, it has been a challenge to ignite the liquid fuel at start-up without relying on the primary gaseous fuel supply to accomplish the transfer.

One challenge with the ignition of liquid fuel at start-up lies in ensuring the proximity of the igniter to a region of ignitable liquid spray. If the igniter is not sufficiently close to the ignitable liquid spray, ignition will fail to occur. Some legacy ignition systems have relied on a spark igniter positioned within the flame zone and then retracted due to the pressure of the ignited combustion gases. Such spark igniters may experience accelerated wear due to their proximity to the hot combustion gases, particularly if the retraction mechanism fails to perform properly.

A related challenge with the ignition of liquid fuel occurs in those combustion systems that use cross-fire tubes to propagate a flame among an array of combustors. In these systems, if the flammable liquid fails to span the width of the combustor (and thereby enter the range of the cross-fire tubes), proper cross-firing of the combustors will fail to occur. This problem may be exacerbated when the liquid fuel is delivered from a centrally located liquid fuel cartridge.

Another challenge related to the ignition of liquid fuel occurs in combustion systems having non-intersecting liquid fuel jets exiting from a liquid fuel cartridge. In such systems, it may be difficult or impossible to ignite each of the non-intersecting fuel jects when operating on liquid fuel alone.

Existing methods for igniting liquid fuel in a combustion system often rely on the existence of a pre-established flame. For example, typically liquid fuel is ignited by first flowing and igniting a gaseous fuel through one or more fuel nozzles, then subsequently flowing liquid fuel through one or more liquid fuel cartridges. The pre-existing flame from the gaseous fuel exiting the fuel nozzles will propagate to and ignite the liquid fuel exiting the liquid fuel cartridge. However, issues exist with this method for igniting liquid fuel in the combustion system.

For instance, because burning gaseous fuel in a combustion system is often given priority over liquid fuel, turbomachines will generally only transition to burning liquid fuel once their gaseous fuel supply begins to run low or is unavailable. Accordingly, it is important that the remainder of the gaseous fuel is managed efficiently in order to ensure the turbomachine can perform multiple start-ups and can transition to running on liquid fuel alone. As such, methods that rely on a pre-established gaseous flame require relatively large amounts of gaseous fuel that negatively impacts the number of start-ups that can occur.

Accordingly, improved methods for igniting liquid fuel that do not require the existence of a pre-established gas-burning flame are desired in the art. In particular, improved methods for igniting liquid fuel in a combustion system, which advantageously minimize the amount of gaseous fuel used on start-up, are desired in the art.

BRIEF DESCRIPTION

Aspects and advantages of the methods in accordance with the present disclosure will be set forth in part in the following description, or may be obvious from the description, or may be learned through practice of the technology.

In accordance with one embodiment, a method of igniting liquid fuel in a turbomachine combustor is provided. The method includes a step of initiating a flow of gaseous fuel from a gaseous fuel supply to a gaseous fuel nozzle. The method further includes a step of initiating a flow of liquid fuel from a liquid fuel supply to a primary liquid fuel cartridge. After initiating both the flow of gaseous fuel and the flow of liquid fuel, the method includes a step of igniting the flow of gaseous fuel and the flow of liquid fuel with an igniter. The method further includes a step of terminating the flow of gaseous fuel from the gaseous fuel supply to the gaseous fuel nozzle.

In accordance with another embodiment, a method for starting a gas turbine on liquid fuel is provided. The gas turbine includes a rotor shaft mounted to a compressor and a turbine. The gas turbine further includes a plurality of combustors that are disposed between the turbine and the compressor. The method further includes accelerating the rotation of the rotor shaft towards a combustion speed to force air through the gas turbine. The method includes a step of initiating a flow of gaseous fuel from a gaseous fuel supply to a gaseous fuel nozzle. The method further includes a step of initiating a flow of liquid fuel from a liquid fuel supply to a primary liquid fuel cartridge. After initiating both the flow of gaseous fuel and the flow of liquid fuel, the method includes a step of igniting the flow of gaseous fuel and the flow of liquid fuel with an igniter. The method further includes a step of terminating the flow of gaseous fuel from the gaseous fuel supply to the gaseous fuel nozzle.

These and other features, aspects and advantages of the present methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods, including the best mode of making and using the present systems and methods, directed to one of ordinary skill in the art, is set forth in the specification, which makes reference to the appended figures, in which:

FIG. 3 illustrates a side view of a liquid fuel cartridge in accordance with embodiments of the present disclosure;

FIG. 4 illustrates a top view of the cartridge tip of a liquid fuel cartridge in accordance with embodiments of the present disclosure;

FIG. 7 illustrates a flow chart of a method of igniting liquid fuel in a turbomachine combustor in accordance with embodiments of the present disclosure; and FIG. 8 illustrates a flow chart of a method of starting a gas turbine on liquid fuel in accordance with embodiments of the present disclosure.

DETAILED DESCRIPTION

Figure 1:
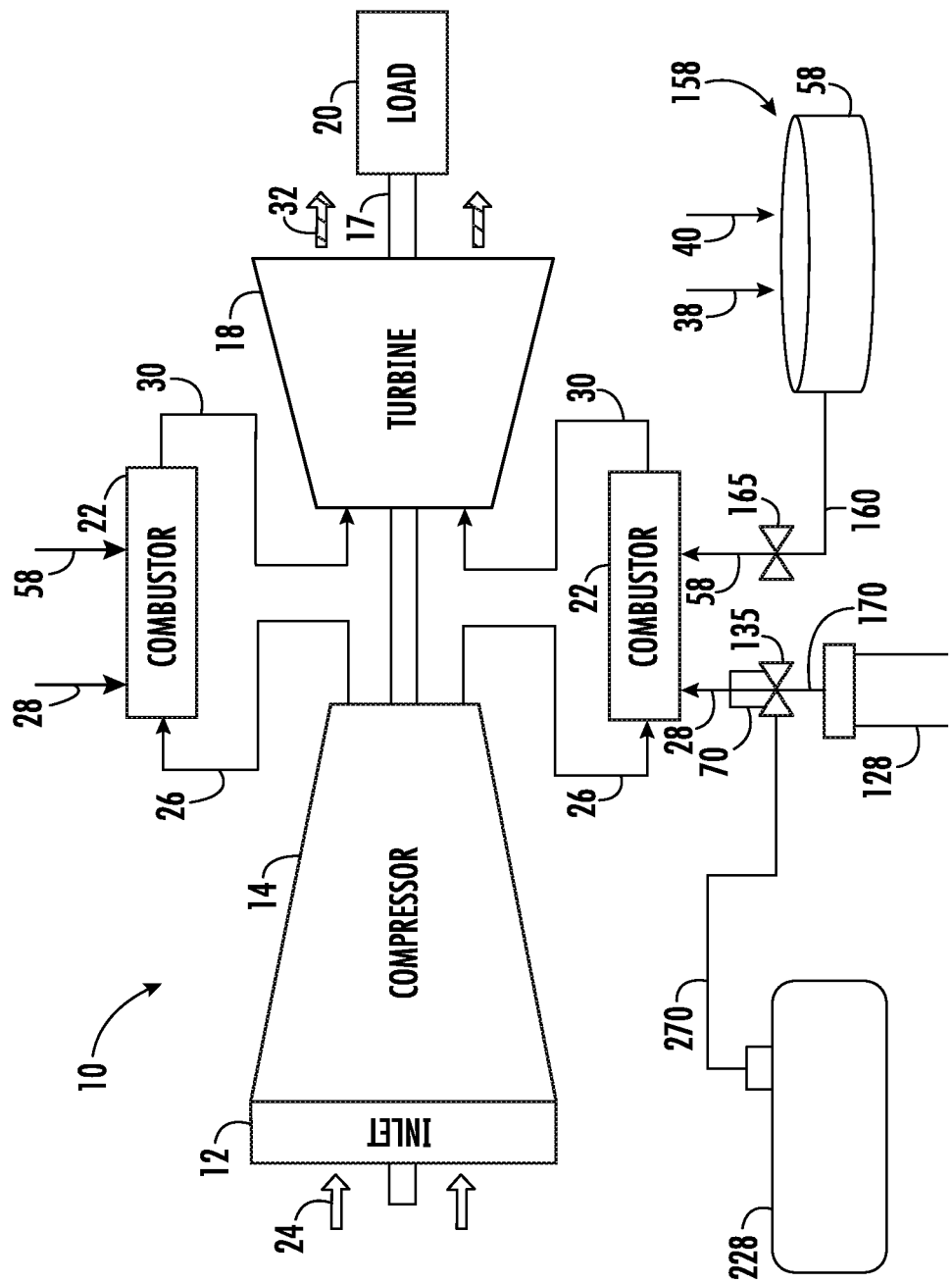
FIG. 1 is a schematic illustration of a turbomachine in accordance with embodiments of the present disclosure.

Reference now will be made in detail to embodiments of the present methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial and/or land-based gas turbine unless otherwise specified in the claims. For example, the methods as described herein may be used in any type of turbomachine including, but not limited to, a steam turbine, an aircraft gas turbine, or a marine gas turbine.

As shown, the gas turbine 10 is a heavy-duty gas turbine used for power generation. The gas turbine 10 generally includes an inlet section 12 that may include a series of filters, cooling coils, moisture separators, and/or other devices to purify and otherwise condition a working fluid (e.g., air) 24 entering the gas turbine 10. The working fluid 24 flows to a compressor section where a compressor 14 progressively imparts kinetic energy to the working fluid 24 to produce a compressed working fluid 26.

The compressed working fluid 26 is mixed with a gaseous fuel 28 or a liquid fuel mixture 58 to form a combustible mixture within one or more combustors 22 of a combustion section or system 16. The gaseous fuel 28 may originate from a main gaseous fuel supply system 128 (such as a gaseous fuel pipeline), via a main gaseous fuel supply line 170, or from an auxiliary gaseous fuel supply 228 (such as a storage tank), via an auxiliary gaseous fuel supply line 270. In various embodiments, a gaseous fuel supply valve 135 may be positioned in fluid communication with the main gaseous fuel supply line 170 and the auxiliary gaseous fuel supply line 270, such that gaseous fuel 28 is delivered from a single source (either the main gaseous fuel supply system 128 or the auxiliary gaseous fuel supply system 228). The liquid fuel mixture 58 originates from a liquid fuel supply system 158 (such as a mixing tank) within which liquid fuel 38 and water 40 are mixed and is delivered to the combustor 22 via a liquid fuel supply line 160. A liquid fuel supply valve 165 controls the delivery of the liquid fuel 58.

The combustible mixture, which may include gaseous and/or liquid fuel, is burned to produce combustion gases 30 having a high temperature, pressure, and velocity. The combustion gases 30 flow through a turbine 18 of a turbine section to produce work. For example, the turbine 18 may be connected to a shaft 17 so that rotation of the turbine 18 drives the compressor 14 to produce the compressed working fluid 26. Alternately, or in addition, the shaft 17 may connect the turbine 18 to a generator 20 for producing electricity.

Exhaust gases 32 from the turbine 18 flow through an exhaust section (not shown) that connects the turbine 18 to an exhaust stack downstream from the turbine. The exhaust section may include, for example, a heat recovery steam generator (not shown) for cleaning and extracting additional heat from the exhaust gases 32 prior to release to the environment.

The combustors 22 may be any type of combustor known in the art, and the present methods are not, limited to any particular combustor design unless specifically recited in the claims. For example, in some embodiments the combustors 22 may make up a can type or a can-annular type of combustion section, in which each combustor 22 may have its own individual combustion chamber that produces a portion of the combustion gases 30. In other embodiments, the combustor 22 may be an annular type combustion section, in which combustion takes place in a common annulus fed by a circumferential array of burners (fuel nozzles).

Figure 2:
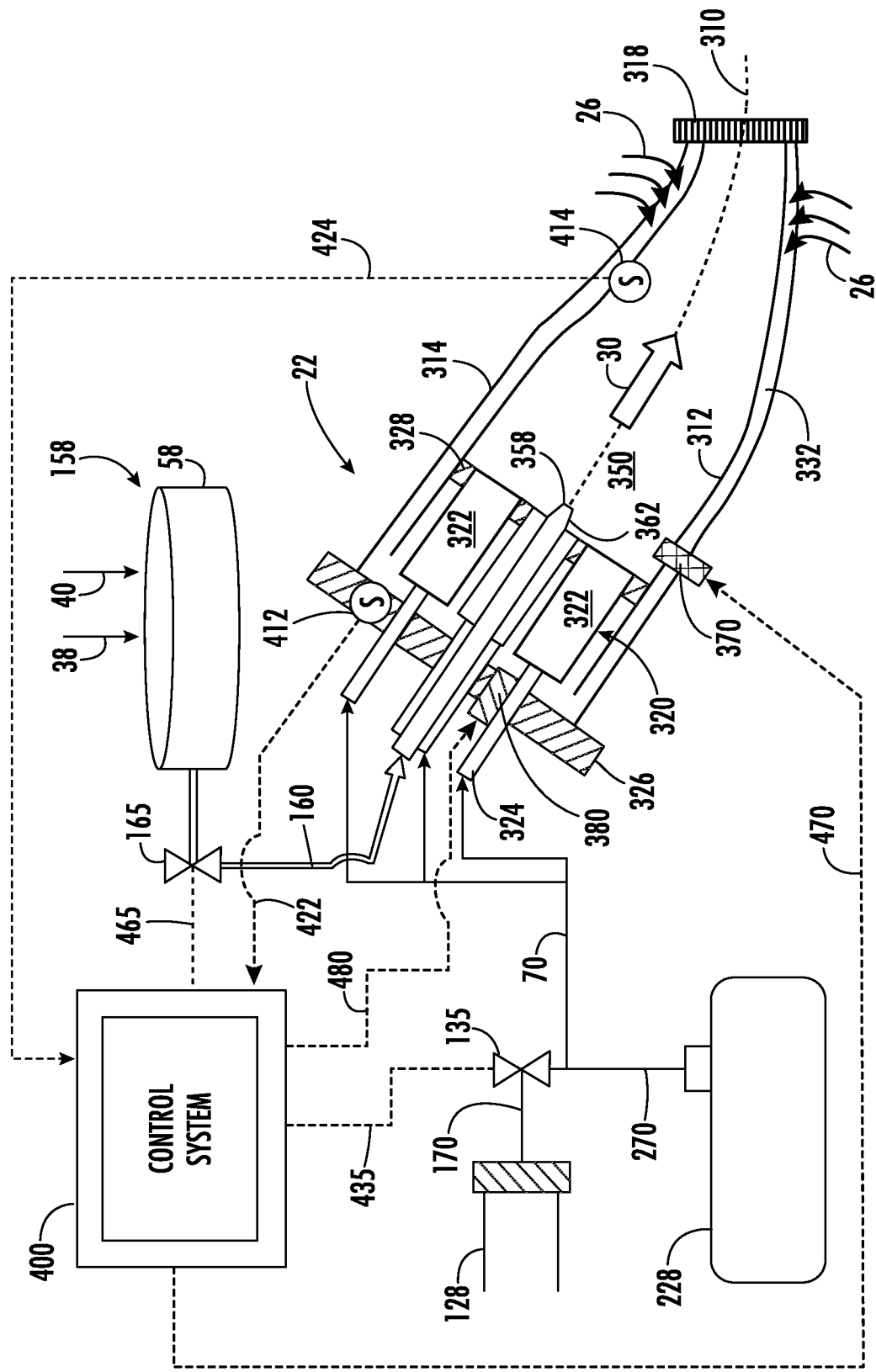
FIG. 2 illustrates a schematic cross-sectional view of a combustor and a liquid fuel ignition system in accordance with embodiments of the present disclosure.

FIG. 2 is a schematic representation of a combustor 22, as may be included in a can annular combustion system 16 for the heavy-duty gas turbine 10. In a can annular combustion system 16, a plurality of combustors 22 (e.g., 8, 10, 12, 14, 16, or more) are positioned in an annular array about the shaft 17 that connects the compressor 14 to the turbine 18. Each combustor 22 of the plurality of combustors has its own localized combustion chamber, such that combustion gases 30 may flow from each can-annular combustor 22 towards the turbine section 18.

As shown in FIG. 2, the combustor 22 includes a liner 312 that contains and conveys combustion gases 30 to the turbine. The liner 312 may define a combustion chamber within which combustion occurs. The liner 312 may have a cylindrical liner portion and a tapered transition portion that is separate from the cylindrical liner portion, as in many conventional combustion systems. Alternately, the liner 312 may have a unified body (or "unibody") construction, in which the cylindrical portion and the tapered portion are integrated with one another. Thus, any discussion herein of the liner 312 is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The liner 312 is surrounded by an outer sleeve 314, which is spaced radially outward of the liner 312 to define an annulus 332 between the liner 312 and the outer sleeve 314. The outer sleeve 314 may include a flow sleeve portion at the forward end and an impingement sleeve portion at the aft end, as in many conventional combustion systems. Alternately, the outer sleeve 314 may have a unified body (or "unisleeve") construction, in which the flow sleeve portion and the impingement sleeve portion are integrated with one another in the axial direction. As before, any discussion herein of the outer sleeve 314 is intended to encompass both conventional combustion systems having a separate flow sleeve and impingement sleeve and combustion systems having a unisleeve outer sleeve.

Figure 5:
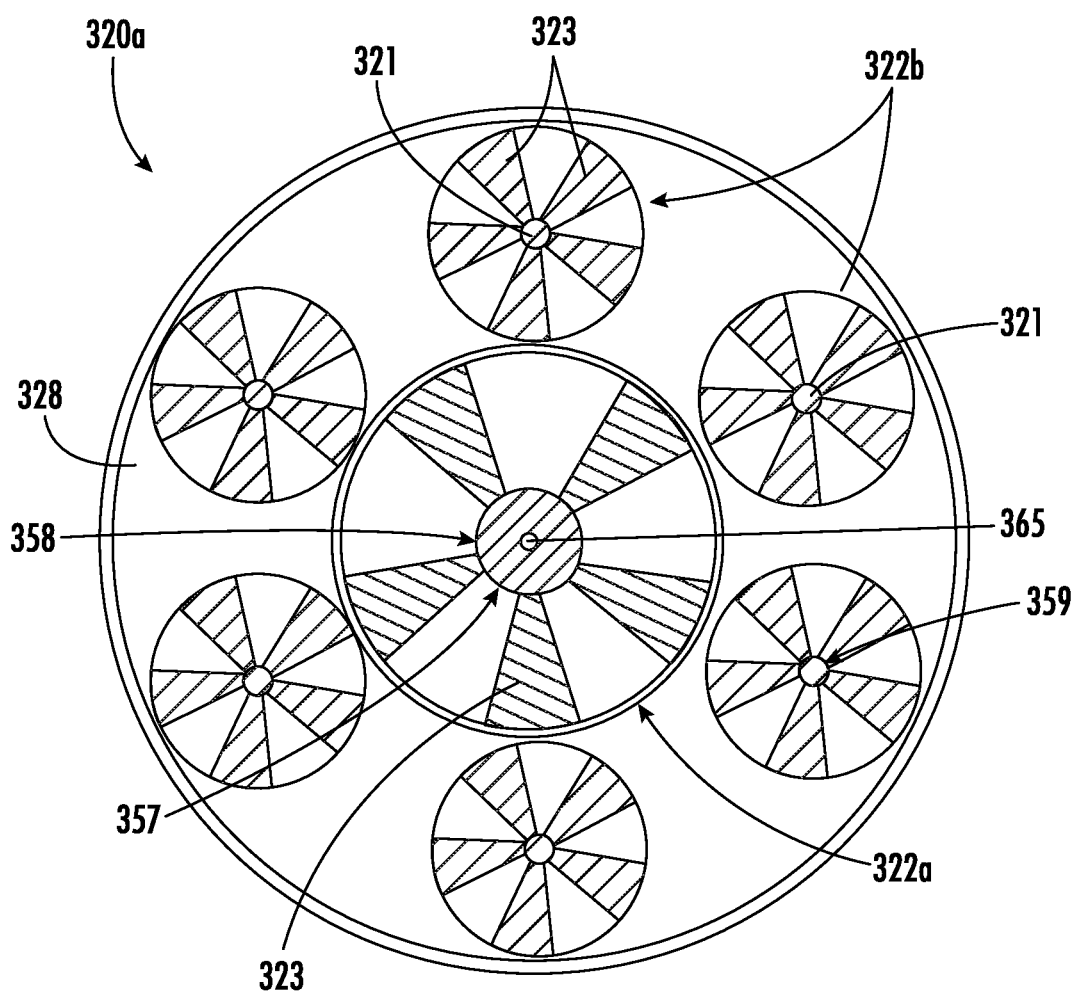
FIG. 5 illustrates a plan (aft-looking-forward) view of a first exemplary combustor head end in accordance with embodiments of the present disclosure.

A head end portion 320 of the combustor 22 includes one or more fuel nozzles 322. The fuel nozzles 322 have a fuel inlet 324 at an upstream (or inlet) end. The fuel inlets 324 may be formed through an end cover 326 at a forward end of the combustor 22. The downstream (or outlet) ends of the fuel nozzles 322 extend into and/or through a combustor cap 328 (also shown in FIG. 4) or include an aft plate 368 that functions as a cap (as shown in FIG. 5).

In many embodiments, the head end portion 320 of the combustor 22 may be at least partially surrounded by a forward casing, which is, physically coupled and fluidly connected to a compressor discharge case. In various embodiments, the compressor discharge case may be fluidly connected to an outlet of the compressor 14 and define a pressurized air plenum that surrounds at least a portion of the combustor 22. Compressed air 26 may flow from the compressor discharge case into the annulus 332 at an aft end of the combustor 22, via openings defined in the outer sleeve 314. Because the annulus 332 is fluidly coupled to the head end portion 320, the air flow 26 travels upstream from the aft end of the combustor 22 to the head end portion 320, where the air flow 26 reverses direction and enters the fuel nozzles 322. For example, the air 26 may travel through the annulus 332 in the opposite direction of the combustion gases 30 within the liner 312.

Fuel 28 and compressed air 26 are introduced by the fuel nozzles 322 into a combustion chamber 350 at a forward end of the liner 312, where the fuel 28 and air 26 are ignited, via an igniter 370, and combusted to form the combustion gases 30. The igniter 370 is positioned proximate the head end 320 of the combustor 22. Alternately, the igniter may be a torch-style igniter 380 positioned within the head end 320 of the combustor 22 (for example, through the end cover 326 upstream of one of the fuel nozzles 322). The combustion gases 30 from one combustor 22 travel through cross-fire tubes (not shown) between the liners 312 of adjacent combustors 22 to propagate the flame around the array of combustors 22.

In one embodiment, the fuel 28 and air 26 are mixed within the fuel nozzles 322 (e.g., in a premixed fuel nozzle). In other embodiments, the fuel 28 and air 26 may be separately introduced into the combustion chamber 350 and mixed within the combustion chamber 350 (e.g., as may occur with a diffusion nozzle). Reference made herein to a "fuel/air mixture" should be interpreted as describing both a premixed fuel/air mixture and a diffusion-type fuel/air mixture, either of which may be produced by the fuel nozzles 322.

In the case of liquid fuel operation, a liquid fuel mixture 58 is delivered via the liquid fuel supply line 160 to a liquid fuel cartridge 358. In an exemplary embodiment, the liquid fuel cartridge 358 is installed along an axial centerline 310 of the combustor 22 and is disposed co-axially within one of the fuel nozzles 322. In many embodiments, the liquid fuel cartridge 358 may extend co-axially with both the combustor 22 and a fuel nozzle 322.

The combustion gases 30, which are produced by combusting gaseous fuel 28 and/or liquid fuel 58 with compressed air 26, travel downstream toward an aft frame 318 of the combustor 22, the aft frame 318 representing an aft end of the combustor 22. In many embodiments, the aft frame 318 may be connected to the turbine 18, such that the combustion gases 30 may exit the combustor section 16 at the aft frame 318 and enter the turbine 18.

A control system, or controller, 400 may be used to control the fuel 28, 58 provided to the combustor 22. The control system 400 may be in communication, via a signal 435, with the gaseous fuel supply valve 135, which is disposed along the main gaseous fuel supply line 170 and the auxiliary gaseous fuel supply line 270, such that gaseous fuel 28 is directed from one or both of these supply lines 170 or 270, through the valve 135, and into the gaseous fuel supply line 70. The control system 400 is also in communication, via a signal 465, with the liquid fuel supply valve 165, which is disposed along the liquid fuel supply line 160. In some embodiments, the control system 400 transmits an initiation signal 470 to the igniter 370 during start-up of the combustor 22. In other embodiments, the control system 400 transmits an initiation signal 480 to the torch-style igniter 380 during start-up of the combustion system.

A flame detector 412 or 414 (labeled "S" in FIG. 2 to represent a sensor) may be used to detect a flame within the combustion chamber 350. The flame detector 412 is disposed within, or through, the end cover 326 and is positioned to detect a flame in the combustion chamber 350, as viewed through the upstream end of the fuel nozzle 322. The flame detector 414 may be disposed along an interior surface of the liner 312 and positioned to detect a flame in the combustion chamber 350, as viewed from a downstream end of the combustor 22 looking upstream toward the head end 320 (i.e., from aft looking forward). The flame detector 412 or 414 is in communication with the controller 400, such that the detection of the flame is transmitted as a signal 422, 424 to the controller 400. The flame detector 412, 414 may be any type of flame detector known in the art, including, but not limited to, an optical detector, a spectrometer, a camera, an ultraviolet flame detector, an infrared flame detector, a thermal detector, a pressure sensor, or a combination thereof.

FIG. 3 illustrates a liquid fuel cartridge 358, as may be used with the combustor 22 of FIG. 2. The liquid fuel cartridge 358 includes a cylindrical body 360, a liquid fuel cartridge tip 362, and a mounting flange 366 that defines an inlet 364 that receives the liquid fuel mixture 58 from the liquid fuel supply line 160. As shown, in many embodiments, the cartridge tip may include a base 361 that directly couples to the cylindrical body 360, such that the base 361 is the axially innermost portion of the cartridge tip 362 with respect to the axial direction A. As shown in FIG. 3, the cartridge tip 362 may diverge radially inward from the base 361 to a downstream surface 363, such that the cartridge tip 362 has a generally conical shape. The conical shape of the cartridge tip 362 may be advantageous over, e.g., a cylindrical shape such that it provides an aerodynamic contour that minimizes the potential for fuel vortices or hot spots along the cartridge tip 362. In various embodiments, as shown best in FIG. 2, the cartridge tip 362 may be disposed entirely within the combustion chamber 350 and terminate at the downstream surface 363, which is positioned downstream from the combustor cap 328. As shown in FIG. 3, the cartridge tip 362 may define rows of liquid fuel injection holes 364 circumferentially spaced apart from one another on the cartridge tip 362.

FIG. 4 illustrates a cartridge tip 362 as viewed from slightly downstream looking upstream. As shown in FIGS. 3 and 4, the liquid fuel injection holes 364 may deliver the liquid fuel mixture 58 in a direction oblique and/or perpendicular to the delivery of the fuel/air mixture from the fuel nozzles 322. As shown in FIG. 4, the liquid fuel injection holes 364 may be clustered in circumferentially offset groups, such that the streams of the liquid fuel mixture 58 exiting the cartridge tip 362 do not overlap with one another. As such, a flame from one stream of liquid fuel mixture will generally not propagate to another stream of liquid fuel without the presence of a gaseous fuel. In some embodiments, the downstream surface 363 may define therethrough one or more liquid fuel injection holes 365, which deliver the liquid fuel mixture 58 in a direction parallel to the delivery of the fuel/air mixture from the fuel nozzles 322, i.e., parallel to the axial direction A.

FIG. 5 is a plan view of a first embodiment of a combustor head end 320a, in which the liquid fuel cartridge 358 of FIGS. 3 and 4 is installed. As shown, the liquid fuel cartridge 358 may be a primary liquid fuel cartridge 357 that is installed within a central fuel nozzle 322a, such as a swirling fuel nozzle, swozzle, or other suitable fuel nozzle. The central fuel nozzle 322a is surrounded by a plurality of outer fuel nozzles 322b, which may also be swirling fuel nozzles, swozzles, or other suitable fuel nozzles. As shown, one or more secondary liquid fuel cartridges 359, which may have a similar configuration to the liquid fuel cartridge 358, may be disposed within one or more of the outer fuel nozzles 322b.

Each fuel nozzle 322a, 322b may include swirling vanes 323 that impart a swirling direction to air flowing therethrough. In some embodiments, the swirling vanes 323 of the outer fuel nozzles 322b are disposed about a central hub 321. In other embodiments, as shown, the swirling vanes 323 may be disposed about the secondary liquid fuel cartridge 359. In exemplary embodiments, each of the outer fuel nozzles 322b may include a central hub 321, such that the only liquid fuel cartridge 358 is the primary liquid fuel cartridge 359 which is disposed within the center fuel nozzle 322a. The swirling vanes 323 in the central fuel nozzle 322a may be disposed about the primary liquid fuel cartridge 359. Although six outer fuel nozzles 322b are shown, it should be understood that other numbers of fuel nozzles 322b may be employed (such as 4, 5, or 8 fuel nozzles 322b). The fuel nozzles 322a, 322b are installed, within corresponding openings (not separately labeled) in the combustor cap 328.

Figure 6:
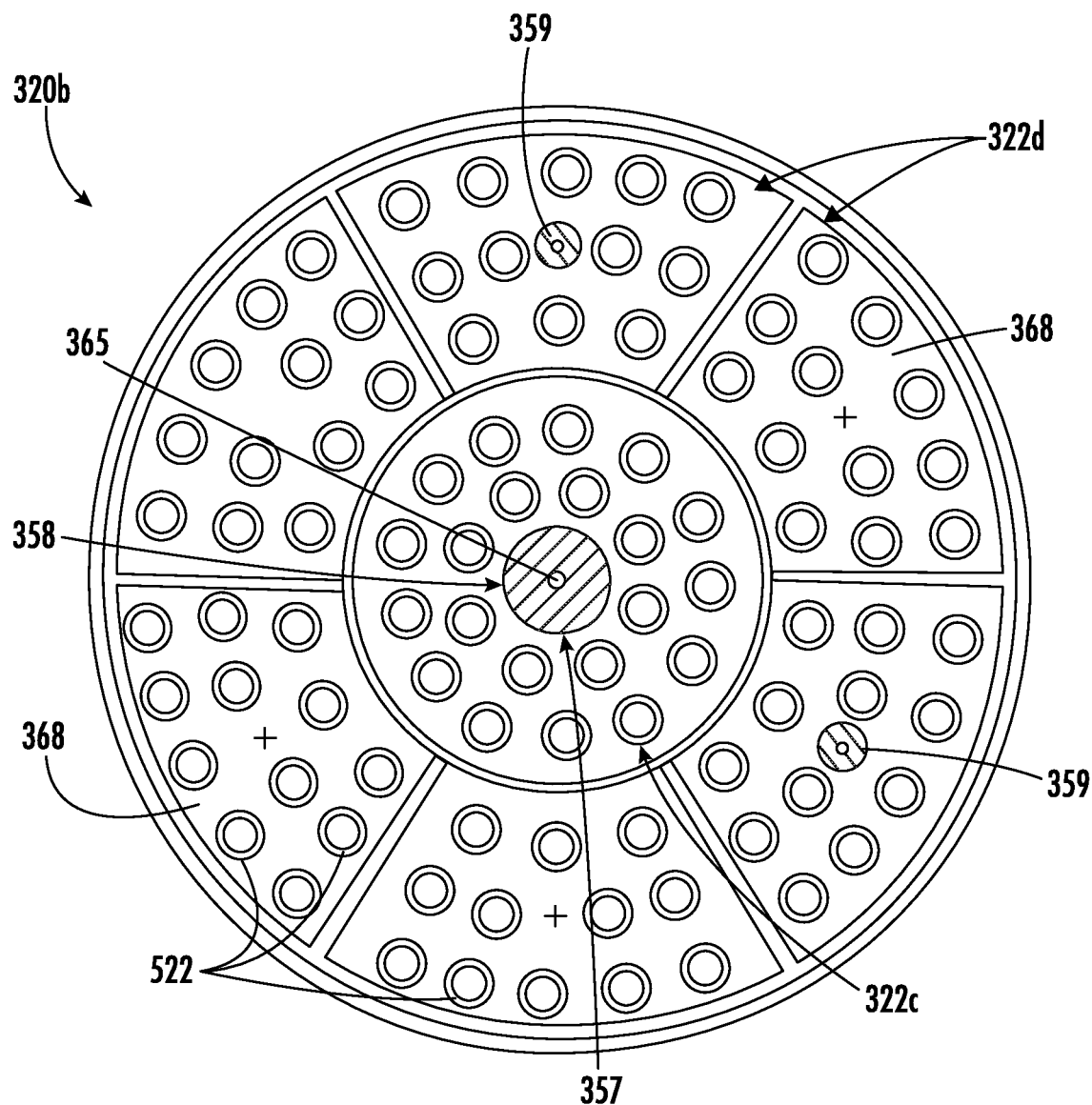
FIG. 6 illustrates a plan (aft-looking-forward) view of a second exemplary combustor head end in accordance with embodiments of the present disclosure.

FIG. 6 is a plan view of a second embodiment of a combustor head end 320b, in which the liquid fuel cartridge 358 of FIGS. 3 and 4 is installed. As shown, the liquid fuel cartridge 358 may be a primary liquid fuel cartridge 357 that is installed within a center fuel nozzle 322c, such as a bundled tube fuel nozzle. The center fuel nozzle 322c is surrounded by a plurality of fuel nozzles 322d, which may also be bundled tube fuel nozzles. As shown, one or more secondary liquid fuel cartridges 359, which may have a similar configuration to the liquid fuel cartridge 358, may be disposed within one or more of the fuel nozzles 322d. Each bundled tube fuel nozzle 322c, 322d includes a plurality of individual premixing tubes 522 within which fuel and air are mixed. The premixing tubes 522 extend through an aft plate 368, which may be unique to each bundled tube fuel nozzle 322c, 322d, or which may extend across all the bundled tube fuel nozzles 322c, 322d.

The bundled tube fuel nozzles 322c, 322d may include an upstream fuel plenum unique to each fuel nozzle 322c, 322d, and each premixing tube 522 may include one or more fuel injection ports in fluid communication with the fuel plenum. Air flowing through an inlet end of each premixing tube 522 mixes with fuel flowing through the fuel injection port(s), and a mixture of fuel and air is conveyed through an outlet end of each tube 522.

Alternately, each premixing tube 522 may include an inlet end in which a fuel lance is installed. A plurality of air inlet holes is disposed downstream of the fuel lance, such that air flowing through the air inlet holes is mixed with fuel from the fuel lance. A mixture of fuel and air is conveyed through the outlet end of each tube 522.

Although the bundled tube fuel nozzles 322d are shown as having a sector shape that includes two radially extending sides and two oppositely disposed arcuate sides, it should be understood that the bundled tube fuel nozzles 322d may have any shape or size relative to the center bundled tube fuel nozzle 322c.

FIG. 7 is a flow chart of a sequential set of steps 710 through 760, which define a method 700 of igniting a liquid fuel in a gas turbine combustor, according to an embodiment of the present disclosure. The flow chart includes schematic diagrams to illustrate respective flows from the fuel nozzles 322 and the liquid fuel cartridge 358 of the combustor 22 of FIG. 2.

As indicated in FIG. 7 by the dotted box, the method 700 may include an optional step 710. The optional step 710 may include detecting with one or more flame detectors, such as the flame detectors 412, 414, that that there is no active flame within the combustion chamber 350. As described herein, the flame detectors 412, 414 are operable to sense the presence of a flame within the combustion chamber 350 and to communicate the sensed data to the controller 400 via a signal 422, 424.

Step 720 includes initiating a flow of gaseous fuel 28 from a gaseous fuel supply to a gaseous fuel nozzle 322. Step 730 includes initiating a flow of liquid fuel 58 from a liquid fuel supply to a primary liquid fuel cartridge 357. As shown in FIG. 2, the gaseous fuel supply may be the main gaseous fuel supply 128, the auxiliary gaseous fuel supply 228, or both. Similarly, the liquid fuel supply may be the liquid fuel supply system 158. The steps 720 and 730 may be performed by transmitting a signal 435 to a gaseous fuel supply valve 135 and a signal 465 to a liquid fuel supply valve 165, in order to open both the valves 135, 165 and provide gaseous fuel and liquid fuel to the combustion zone 350 prior to ignition within the combustor.

In exemplary embodiments, the method 700 advantageously does not require ignition of the gaseous fuel 28 before the flow of liquid fuel 58 is initiated, which allows for a more efficient use of the gaseous fuel 28. In this way, gaseous fuel 28 may be efficiently utilized in order to maximize the number of start-ups when operating the gas turbine 10 on liquid fuel 58.

In some embodiments, the steps 720 and 730 may be performed simultaneously. In such embodiments, the signal 435 to open a gaseous fuel supply valve 135 and the signal 465 to open a liquid fuel supply valve 165 may be sent at the same time, in order to provide gaseous fuel 28 and liquid fuel 58 within the combustor 22 at the same time. As shown in FIG. 2, opening the gaseous fuel supply valve 135 may allow for gaseous fuel to flow from either the main gaseous fuel supply 128, the auxiliary fuel supply 228, or both to the gaseous fuel nozzles 322 via the fuel supply line 70. Likewise, opening the liquid fuel supply valve 165 may allow for liquid fuel to flow from the liquid fuel supply system 158 to the liquid fuel cartridge 358 via the liquid fuel supply line 160. As a result, a gaseous fuel/air mixture is delivered from the gaseous fuel nozzles 322 to the combustion zone 350, and liquid fuel 58 is delivered from the primary liquid fuel cartridge 357 to the combustion zone 350, prior to ignition within the combustor 22, as shown in the schematic diagram 735.

In step 740, after both step 720 and step 730 have been performed, the controller 400 initiates an igniter, such as an igniter 370 or torch igniter 380, by transmitting a signal 470 and/or 480 to the igniter 370 and/or the torch igniter 380. Performing steps 720 and 730 prior to 740 advantageously allows for simultaneous ignition of the gaseous fuel 28 and the liquid fuel 58, which allows for gaseous fuel savings.

In many embodiments, the gaseous fuel 28 and liquid fuel 58 may be ignited via the igniter 370, which is positioned downstream from the gaseous fuel nozzles 322 and the liquid fuel cartridge 358. The igniter 370 may generate a spark that ignites the gaseous fuel/air mixture within the combustion chamber 350.

In exemplary embodiments, the gaseous fuel 28 and liquid fuel 58 may be ignited via the torch igniter 380, which is positioned within the head end 320 of the combustor 22 (for example, through the end cover 326 upstream of one of the fuel nozzles 322). The flame generated by the gaseous fuel/air mixture will immediately propagate to the liquid fuel 58 exiting the primary liquid fuel cartridge 358 due to the presence of the liquid fuel 58 within the combustor 22 at the moment of gaseous fuel ignition.

The method 700 may also include an optional step 750 of detecting, with the one or more flame detectors 412, 414, the presence of a flame emanating form both of the gaseous fuel nozzles 322 and the liquid fuel cartridge 358 within the combustion zone 350. The controller 400 may receive a signal 422, 424 from one or both of the flame detectors 412, 414 that combustion has taken place within the combustion chamber and that a flame is emanating from the gaseous fuel nozzles 322 and the liquid fuel cartridge 358. This step may be performed in order to affirm that the liquid fuel 58 exiting the liquid fuel cartridge 358 has ignited.

In step 760, the controller 400 may terminate the gaseous fuel supply to the gaseous fuel nozzles 322 by transmitting a second signal 435 to only the gaseous fuel supply valve 135. The gaseous fuel supply valve 135 closes a passage between the gaseous fuel supply line 170 and/or 270 and the gaseous fuel supply line 70. The passages from the gaseous fuel supply line 170 to the gaseous fuel supply line 70 and from the gaseous fuel supply line 270 to the gaseous fuel supply line 70 remain closed, such that no gaseous fuel 28 is permitted to travel through gaseous fuel supply line 70 to the gaseous fuel nozzles 322. As a result, only the liquid fuel mixture 58 is delivered from the liquid fuel cartridge 358, and the gaseous fuel nozzles 322 are unfueled (i.e., may deliver air only), as shown in schematic diagram 755. The controller 400 may initiate step 760 based on a time sequence or based upon receipt of the signal 422 or 424, if step 750 is included.

FIG. 8 is a flow chart of a sequential set of steps 810 through 870, which define a method 800 of starting a gas turbine on liquid fuel, according to another aspect of the present disclosure. As described in detail above, the gas turbine 10 may include a rotor shaft 17 coupled to a compressor 14 and a turbine 18, and a plurality of combustors 22 may be disposed between the turbine 18 and the compressor 14. As shown in FIG. 8, the flow chart includes schematic diagrams to illustrate respective flows from the fuel nozzles 322 and the liquid fuel cartridge 358 of the combustor 22 of FIG. 2.

The method 800 may include a step 810 of accelerating the rotation of the rotor shaft 17 towards a combustion speed in order to force air through the gas turbine 10. Forcing air through the gas turbine 10 includes flowing air through the combustors 22, e.g., through the one or more gaseous fuel nozzles 322, such that air is present in the combustion chamber before combustion takes place. Once the rotor shaft has reached the combustion speed, fuel may begin to be routed to the gaseous fuel nozzles 322 and/or the liquid fuel cartridge 358.

As indicated in FIG. 8 by the dotted box, the method 800 may include an optional step 820. The optional step 820 may include detecting with one or more flame detectors, such as the flame detectors 412, 414, that there is no active flame within the combustion chamber 350. As described herein, the flame detectors 412, 414 are operable to sense the presence of a flame within the combustion chamber 350 and to communicate the sensed data with the controller 400 via a signal 422, 424.

Step 830 includes initiating a flow of gaseous fuel from a gaseous fuel supply to a gaseous fuel nozzle 322. Step 840 includes initiating a flow of liquid fuel from a liquid fuel supply to a primary liquid fuel cartridge 357. As shown in FIG. 2, the gaseous fuel supply may be the main gaseous fuel supply 128, the auxiliary gaseous fuel supply 228, or both. Similarly, the liquid fuel supply may be the liquid fuel supply system 158. The steps 830 and 840 may be performed by transmitting a signal 435 to a gaseous fuel supply valve 135 and a signal 465 to a liquid fuel supply valve 165, in order to open both the valves 135, 165 and to provide gaseous fuel 28 and liquid fuel 58 to the combustion zone 350 prior to ignition within the combustor 22.

In exemplary embodiments, the method 800 advantageously does not require ignition of the gaseous fuel 28 before the flow of liquid fuel 58 is initiated, which allows for a more efficient use of the gaseous fuel 28. In this way, gaseous fuel 28 may be efficiently utilized in order to maximize the number of start-ups when operating the gas turbine 10 on liquid fuel 58.

In some embodiments, the steps 830 and 840 may be performed simultaneously. In such embodiments, the signal 435 to open a gaseous fuel supply valve 135 and the signal 465 to open a liquid fuel supply valve 165 may be sent at the same time, in order to provide gaseous fuel 28 and liquid fuel 58 within the combustor 22 at the same time. As shown in FIG. 2, opening the gaseous fuel supply valve 135 may allow for gaseous fuel to flow from either the main gaseous fuel supply 128, the auxiliary fuel supply 228, or both to the gaseous fuel nozzles 322 via the fuel supply line 70. Likewise, opening the liquid fuel supply valve 165 may allow for liquid fuel to flow from the liquid fuel supply system 158 to the liquid fuel cartridge 358 via the liquid fuel supply line 160. As a result, a gaseous fuel/air mixture is delivered from the gaseous fuel nozzles 322 to the combustion zone 350, and liquid fuel 58 is delivered from the primary liquid fuel cartridge 357 to the combustion zone 350, prior to ignition within the combustor 22, as shown in the schematic diagram 845.

In step 850, the controller 400 initiates an igniter, such as an igniter 370 or torch igniter 380, by transmitting a signal 470 and/or 480 to the igniter 370 and/or the torch igniter 380. In many embodiments, the gaseous fuel 28 and liquid fuel 58 may be ignited via the igniter 370, which is positioned downstream from the gaseous fuel nozzles 322 and the liquid fuel cartridge 358. The igniter 370 may generate a spark that ignites the gaseous fuel/air mixture within the combustion chamber 350.

In exemplary embodiments, the gaseous fuel 28 and liquid fuel 58 may be ignited via the torch igniter 380, which is positioned within the head end 320 of the combustor 22 (for example, through the end cover 326 upstream of one of the fuel nozzles 322). The flame generated by the gaseous fuel/air mixture will immediately propagate to the liquid fuel 58 exiting the primary liquid fuel cartridge 357 due to the presence of the liquid fuel 58 within the combustor 22 at the moment of gaseous fuel ignition.

The method 800 may also include an optional step 860 of detecting, with the one or more flame detectors 412, 414, the presence of a flame emanating from both the gaseous fuel nozzles 322 and the liquid fuel cartridge 358 within the combustion zone 350. The controller 400 may receive a signal 422, 424 from one or both of the flame detectors 412, 414 that combustion has taken place within the combustion chamber 350 and that a flame is emanating from the gaseous fuel nozzles 322 and the liquid fuel cartridge 358. This step may be performed in order to affirm that the liquid fuel 58 exiting the liquid fuel cartridge 358 has ignited.

In step 870, the controller 400 may terminate the gaseous fuel supply to the gaseous fuel nozzles 322 by transmitting a second signal 435 to only the gaseous fuel supply valve 135. The gaseous fuel supply valve 135 closes a passage between the gaseous fuel supply line 170 and/or 270 and the gaseous fuel supply line 70. The passage from the gaseous fuel supply line 170 to the gaseous fuel supply line 70 and from the gaseous fuel supply line 270 to the gaseous fuel supply line 70 remain closed, such that no gaseous fuel 28 is permitted to travel through gaseous fuel supply line 70 to the gaseous fuel nozzles 322. As a result, only the liquid fuel mixture is delivered from the liquid fuel cartridge 358, and the gaseous fuel cartridges 322 are unfueled (i.e., may deliver air only), as shown in schematic diagram 875. The controller 400 may initiate step 870 based on a time sequence or based upon receipt of the signal 422 or 424, if step 860 is included.

In many embodiments, the methods 700 and 800 may be performed having access to only an auxiliary fuel supply, such as the auxiliary fuel supply system 228 described herein. In such embodiments, the main gaseous fuel supply system 128 may be unavailable. Therefore, it is very important that the gaseous fuel from the auxiliary fuel supply system 228 is efficiently managed in order to ensure the gas turbine can perform multiple start-ups and operate on liquid fuel.

Thus, within a matter of tens of seconds (for example, less than a minute), the combustor 22 may be successfully started and operating on liquid fuel. The methods 700, 800 described herein advantageously allow for the gas turbine 10 to be started without a pre-established flame in the combustor 22, which advantageously minimizes the amount of gaseous fuel required at start up, thereby efficiently managing the fuel supply available within the auxiliary fuel supply system 228 for the maximum number of start-ups. In particular, the methods 700, 800 described herein may be advantageous over a method that requires a pre-established flame, i.e. a "fuel transfer method," because the methods 700, 800 require much less gaseous fuel than said fuel transfer method. For example, in a fuel transfer method, gaseous fuel is ignited within the combustor before liquid fuel is even introduced, which requires a large portion of gaseous fuel from the axillary fuel supply. Using the present methods, multiple starts may be accomplished from a single gaseous fuel tank 228, thereby providing greater operational flexibility to the plant operator.

The methods and systems described herein facilitate the ignition of liquid fuel in a gas turbine combustor. More specifically, the methods and systems facilitate igniting liquid fuel without access to a primary gaseous fuel supply. The methods and systems therefore facilitate improving the overall operating flexibility of a combustor, such as a combustor in a gas turbine assembly. This may reduce the costs associated with operating a combustor, such as a combustor in a gas turbine assembly, and/or increase the operational hours (and output) of the combustor.

Exemplary embodiments of liquid fuel ignition methods are described above in detail. The methods described herein are not limited to the specific embodiments described herein, but rather, components of the methods may be utilized independently and separately from other components described herein. For example, the methods described herein may have other applications not limited to practice with turbine assemblies, as described herein. Rather, the method and systems described herein can be implemented and utilized in connection with various other industries.

This written description uses examples to disclose the invention, including the best mode, and also to enable any person skilled in the art to practice the invention, including making and using any devices or systems and performing any incorporated methods. The patentable scope of the invention, which is defined by the claims, may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of igniting liquid fuel in a turbomachine combustor, the method comprising:
    initiating a flow of gaseous fuel from a gaseous fuel supply to a gaseous fuel nozzle;
    initiating a flow of liquid fuel from a liquid fuel supply to a liquid fuel cartridge, wherein the step of initiating the flow of liquid fuel occurs with or after the step of initiating the flow of gaseous fuel;
    after initiating both the flow of gaseous fuel and the flow of liquid fuel, simultaneously igniting the flow of gaseous fuel and the flow of liquid fuel with an igniter; and
    terminating the flow of gaseous fuel from the gaseous fuel supply to the gaseous fuel nozzle.

2. The method as in claim 1, wherein the liquid fuel cartridge is positioned along an axial centerline of the turbomachine combustor, and wherein the gaseous fuel nozzle surrounds the liquid fuel cartridge, the liquid fuel cartridge and the gaseous fuel nozzle being positioned in a head end of the turbomachine combustor.

3. The method as in claim 1, wherein the step of initiating the flow of gaseous fuel and the step of initiating the flow of liquid fuel are performed simultaneously.

4. The method as in claim 1, wherein the gaseous fuel supply is one of a main gaseous fuel supply system, an auxiliary gaseous fuel supply system, or both the main auxiliary gaseous fuel supply system and the auxiliary gaseous fuel supply system.

5. The method as in claim 1, further comprising providing a controller in communication with the igniter, the gaseous fuel supply, and the liquid fuel supply.

6. The method as in claim 5, further comprising detecting a flame within a combustion chamber of the turbomachine combustor using a flame detector, the flame detector being in communication with the controller.

7. The method as in claim 6, wherein the step of initiating the flow of gaseous fuel and the step of initiating the flow of liquid fuel occur before the flame detector detects a flame in the combustion chamber.

8. The method as in claim 1, wherein the step of initiating the flow of gaseous fuel from the gaseous fuel supply is accomplished by controlling a gaseous fuel valve located in a gaseous fuel supply line extending from the gaseous fuel supply.

9. The method as in claim 8, wherein the step of terminating the flow of gaseous fuel from the gaseous fuel supply is accomplished by controlling the gaseous fuel valve.

10. The method as in claim 1, wherein the step of initiating the flow of liquid fuel from the liquid fuel supply is accomplished by controlling a liquid fuel valve located in a liquid fuel supply line extending between the liquid fuel supply and the liquid fuel cartridge.

11. A method of starting a gas turbine on liquid fuel, the gas turbine comprising a rotor shaft coupled to a compressor and a turbine, wherein a plurality of combustors is disposed between the turbine and the compressor, the method comprising:
    accelerating the rotation of the rotor shaft towards a combustion speed to force air through the gas turbine; and
    within each combustor of the plurality of combustors:
    initiating a flow of gaseous fuel from a gaseous fuel supply to a gaseous fuel nozzle;
    initiating a flow of liquid fuel from a liquid fuel supply to a liquid fuel cartridge, wherein the step of initiating the flow of liquid fuel occurs with or after the step of initiating the flow of gaseous fuel;
    after initiating both the flow of gaseous fuel and the flow of liquid fuel, simultaneously igniting the flow of gaseous fuel and the flow of liquid fuel with an igniter; and
    terminating the flow of gaseous fuel from the gaseous fuel supply to the gaseous fuel nozzle.

12. The method as in claim 11, wherein the liquid fuel cartridge is positioned along an axial centerline of each combustor of the plurality of combustors, and wherein the gaseous fuel nozzle surrounds the liquid fuel cartridge, the liquid fuel cartridge and the respective gaseous fuel nozzle being positioned in a head end of each combustor of the plurality of combustors.

13. The method as in claim 11, wherein the step of initiating the flow of gaseous fuel and the step of initiating the flow of liquid fuel are performed simultaneously.

14. The method as in claim 11, wherein the gaseous fuel supply is one of a main gaseous fuel supply system, an auxiliary gaseous fuel supply system, or both the main auxiliary gaseous fuel supply system and the auxiliary gaseous fuel supply system.

15. The method as in claim 11, further comprising providing a controller in communication with the igniter, the gaseous fuel supply, and the liquid fuel supply.

16. The method as in claim 15, further comprising detecting a flame within a combustion chamber of a combustor of the plurality of combustors using a flame detector, the flame detector being in communication with the controller.

17. The method as in claim 16, wherein the step of initiating the flow of gaseous fuel and the step of initiating the flow of liquid fuel occur before the flame detector detects a flame in the combustion chamber.

18. The method as in claim 11, wherein the step of initiating the flow of gaseous fuel from the gaseous fuel supply is accomplished by controlling a gaseous fuel valve located in a gaseous fuel supply line extending from the gaseous fuel supply.

19. The method as in claim 18, wherein the step of terminating the flow of gaseous fuel from the gaseous fuel supply is accomplished by controlling the gaseous fuel valve.

20. The method as in claim 11, wherein the liquid fuel cartridge includes a cartridge tip, and wherein the cartridge tip defines rows of liquid fuel injection holes circumferentially spaced apart from one another on the cartridge tip.

* * * * *